US008982105B2

(12) United States Patent
Frisbee

(10) Patent No.: US 8,982,105 B2
(45) Date of Patent: Mar. 17, 2015

(54) ERGONOMIC USER INTERFACES AND ELECTRONIC DEVICES INCORPORATING SAME

(75) Inventor: Mark Steven Frisbee, Raleigh, NC (US)

(73) Assignees: Sony Corporation, Lund (SE); Sony Mobile Communications AB, Lund (SE)

(*) Notice: Subject to any disclaimer, the term of this patent is extended or adjusted under 35 U.S.C. 154(b) by 1225 days.

(21) Appl. No.: 12/330,795

(22) Filed: Dec. 9, 2008

(65) Prior Publication Data

US 2010/0141609 A1  Jun. 10, 2010

(51) Int. Cl.
| | | |
|---|---|---|
| G06F 3/033 | (2013.01) | |
| G06F 3/0362 | (2013.01) | |
| G06F 3/023 | (2006.01) | |
| G06F 3/0338 | (2013.01) | |

(52) U.S. Cl.
CPC ............ *G06F 3/0362* (2013.01); *G06F 3/0234* (2013.01); *G06F 3/0236* (2013.01); *G06F 3/0338* (2013.01)
USPC .......................................... 345/184; 345/168

(58) Field of Classification Search
CPC ..... G06F 3/02; G06F 3/04847; G06F 3/0233; G06F 3/0362
USPC .......................................... 345/184, 168–179
See application file for complete search history.

(56) References Cited

U.S. PATENT DOCUMENTS

| | | | | |
|---|---|---|---|---|
| 4,019,037 A | * | 4/1977 | Monna ........................... 708/111 |
| 4,726,687 A | * | 2/1988 | Gander ........................... 368/10 |
| 5,627,531 A | * | 5/1997 | Posso et al. ..................... 341/22 |
| 5,856,827 A | * | 1/1999 | Sudo .............................. 715/841 |
| 5,982,710 A | * | 11/1999 | Rawat et al. .................... 368/21 |
| 6,992,658 B2 | * | 1/2006 | Wu et al. ........................ 345/169 |
| 7,420,547 B2 | * | 9/2008 | Takahashi ...................... 345/184 |
| 7,710,409 B2 | * | 5/2010 | Robbin et al. ................. 345/184 |
| 7,778,818 B2 | * | 8/2010 | Longe et al. ...................... 704/9 |
| 8,264,471 B2 | * | 9/2012 | Martensson ................... 345/173 |

(Continued)

FOREIGN PATENT DOCUMENTS

| | | |
|---|---|---|
| DE | 102005015934 A1 | 10/2006 |
| WO | WO 2006/092693 A1 | 9/2006 |

OTHER PUBLICATIONS

Notification of Transmittal of the International Search Report and the Written Opinion of the International Searching Authority issued on Sep. 15, 2009 by the European Patent Office for a corresponding PCT application No. PCT/US2009/003572.

*Primary Examiner* — Alexander Eisen
*Assistant Examiner* — Nelson Lam
(74) *Attorney, Agent, or Firm* — Myers Bigel Sibley & Sajovec

(57) ABSTRACT

An electronic device includes a housing that encloses a controller and/or other electronic components, a display viewable through a face of the housing that is configured to display an alphanumeric character list, and an input device adjacent the display that is movable by a user to highlight and select respective alphanumeric characters in a displayed character list. To highlight characters within a displayed character list, the input device is rotatable about an axis that is substantially normal to the display and is slidable within a plane that is substantially orthogonal to the axis. In some embodiments, the input device is rotatable and slidable within a plane that is substantially parallel with a plane defined by the housing face. To select a highlighted character, a user depresses the input device.

13 Claims, 5 Drawing Sheets

(56) References Cited

U.S. PATENT DOCUMENTS

| | | | |
|---|---|---|---|
| 8,386,958 B1* | 2/2013 | Zavitaev et al. | 715/810 |
| 8,406,816 B2* | 3/2013 | Marui et al. | 455/566 |
| 2002/0101457 A1 | 8/2002 | Lang | |
| 2002/0122031 A1* | 9/2002 | Maglio et al. | 345/184 |
| 2003/0038729 A1* | 2/2003 | Dunsmore et al. | 340/815.53 |
| 2004/0207601 A1* | 10/2004 | SanGiovanni | 345/156 |
| 2005/0195170 A1* | 9/2005 | Habu | 345/168 |
| 2005/0240879 A1* | 10/2005 | Law et al. | 715/773 |
| 2006/0071917 A1* | 4/2006 | Gomez et al. | 345/184 |
| 2006/0164403 A1* | 7/2006 | Volckers | 345/184 |
| 2006/0196925 A1* | 9/2006 | Dong | 235/375 |
| 2007/0070054 A1* | 3/2007 | Nam et al. | 345/184 |
| 2007/0195065 A1* | 8/2007 | Nielsen | 345/173 |
| 2007/0268258 A1* | 11/2007 | Chen et al. | 345/169 |
| 2007/0271528 A1* | 11/2007 | Park et al. | 715/810 |
| 2007/0296704 A1* | 12/2007 | Park et al. | 345/169 |
| 2008/0079604 A1* | 4/2008 | Madonna et al. | 340/825.72 |
| 2008/0119238 A1* | 5/2008 | Kwon et al. | 455/566 |
| 2008/0259047 A1* | 10/2008 | Jung | 345/173 |
| 2008/0259056 A1* | 10/2008 | Freier et al. | 345/184 |
| 2008/0291162 A1* | 11/2008 | Chyc et al. | 345/156 |
| 2009/0048020 A1* | 2/2009 | Gruen et al. | 463/37 |
| 2009/0225041 A1* | 9/2009 | Kida et al. | 345/173 |
| 2010/0020012 A1* | 1/2010 | Oh | 345/160 |
| 2010/0073486 A1* | 3/2010 | Tai | 348/207.1 |
| 2011/0166916 A1* | 7/2011 | Inbar | 705/14.4 |

* cited by examiner

ERGONOMIC USER INTERFACES AND ELECTRONIC DEVICES INCORPORATING SAME

FIELD OF THE INVENTION

The present invention relates generally to electronic devices, and more particularly to electronic device user interfaces.

BACKGROUND

Hand-held communications devices, such as radiotelephones, have become increasingly popular for both personal and commercial use. However, with their increase in popularity, radiotelephones have also been undergoing miniaturization to facilitate storage and portability. Unfortunately, as these devices become smaller, less area may be available for user interfaces, such as displays and keypads, that users utilize to operate the devices. Hand-held communications devices typically utilize displays, such as liquid crystal displays (LCDs), for various functions and applications. Unfortunately, small displays can present challenges to users. Keypads have also become smaller, thereby causing the size and spacing of keys within keypads to decrease. However, for ergonomic reasons, there is a limit below which it may be undesirable to decrease the size and spacing of keys within a keypad. As a result, further miniaturization of electronic communications devices may be constrained because of user interface ergonomic concerns.

SUMMARY

In view of the above, ergonomic, user interfaces for electronic devices (e.g., wireless communications devices, electronic games, music players, etc.) are provided that do not compromise conventional keypad and display functionality. In some embodiments, a user interface includes a display that is viewable through a face of a housing of an electronic device, and an input device that circumferentially surrounds the display. The display is configured to display an alphanumeric character list and includes a first portion and a second portion. The alphanumeric character list is displayed within the first portion and user selected alphanumeric characters from the list are displayed in the second portion. The input device is rotatable and slidable by a user to highlight a respective alphanumeric character in the display first portion, and is depressible by the user to select and display a highlighted alphanumeric character in the display second portion. Characters in the displayed alphanumeric character list are highlighted by a cursor. Rotational movement of the input device causes the cursor to move along a row of alphanumeric characters in the displayed character list, and wherein slidable movement of the input device causes the cursor to move from one row to another.

According to some embodiments of the present invention, an electronic device includes a housing that encloses a controller and/or other electronic components, a display viewable through a face of the housing that is configured to display an alphanumeric character list, and an input device adjacent the display that is movable by a user to highlight and select respective alphanumeric characters in the displayed character list. To highlight characters within the displayed character list, the input device is rotatable about an axis that is substantially normal to the display and the input device is slidable within a plane that is substantially orthogonal to the axis. In some embodiments, the input device is rotatable and slidable within a plane that is substantially parallel with a plane defined by the housing face. To select a highlighted character, a user depresses the input device.

The display and input device are oriented relative to each other such that the display remains stationary and the input device moves relative to the stationary display. In some embodiments the input device rotates and slides underneath the display. In other embodiments, the input device rotates and slides above the display.

In some embodiments, the display has a circular configuration and the input device has a ring configuration that circumferentially surrounds the display. The display includes a first portion wherein an alphanumeric character list is displayed, and a second portion wherein user selected alphanumeric characters from the character list are displayed (e.g., as a telephone number to be dialed, a text message to be sent, etc.). A character list may be displayed within the display first portion in an arcuate configuration. For example, the character list may be displayed as a plurality of concentric rows of alphanumeric characters. Rotational movement of the input device causes a cursor to move along a row of alphanumeric characters. For example, in some embodiments, clockwise rotational movement of the input device causes a cursor to move along a row of alphanumeric characters in a clockwise direction, and counterclockwise rotational movement of the input device causes a cursor to move along a row of alphanumeric characters in a counterclockwise direction. Slidable movement of the input device may cause a cursor to move from one row to another.

According to some embodiments, an electronic device includes a housing that encloses a controller and/or other electronic components, a display viewable through a face of the housing that is configured to display an alphanumeric character list, and an input device that circumferentially surrounds the display. The input device is rotatable and slidable by a user to highlight a respective alphanumeric character in a displayed character list, and is depressible by the user to select a highlighted alphanumeric character.

User interfaces according to embodiments of the present invention generally require less space than conventional keypads and displays, for example on radiotelephones. Accordingly, electronic device miniaturization efforts can be accommodated by user interfaces of the present invention without sacrificing conventional keypad and display functionality.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

Figure 1:
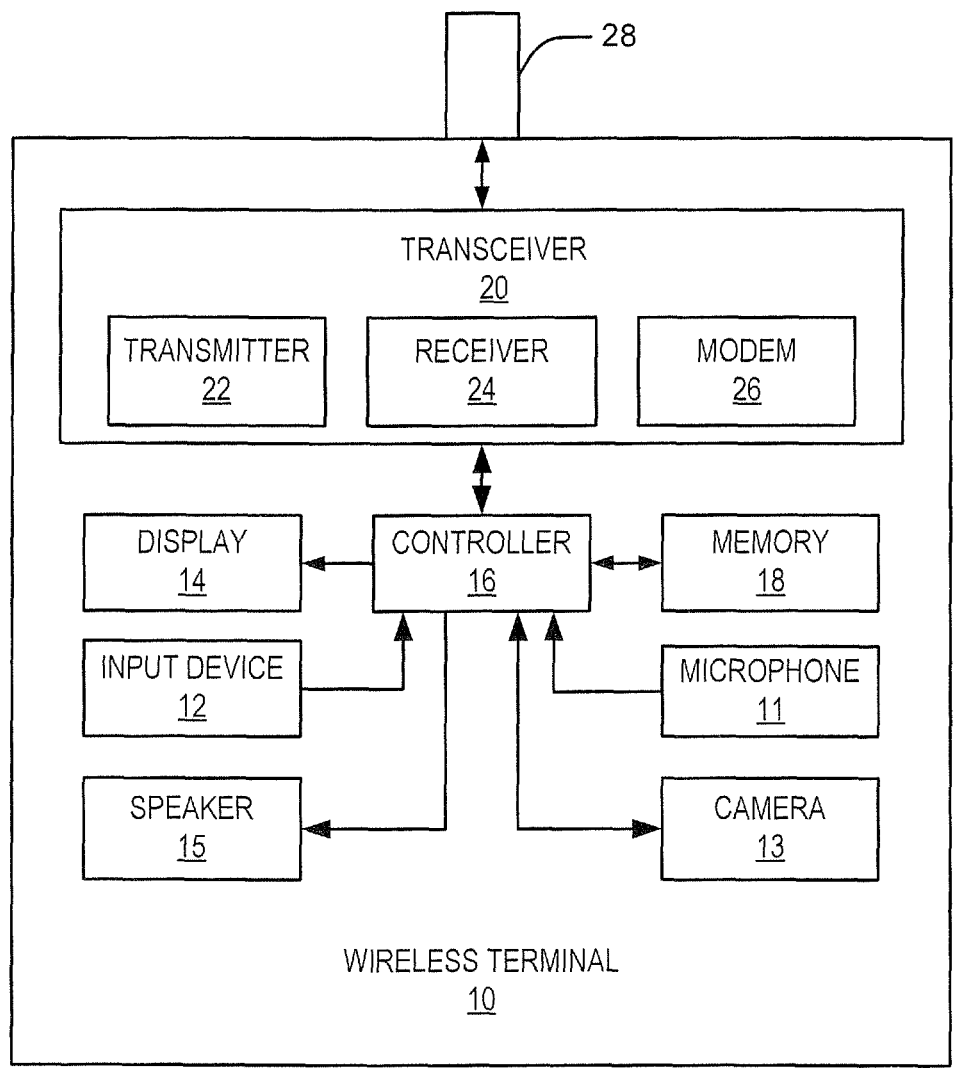
FIG. 1 is a schematic illustration of a conventional arrangement of electronic components of a wireless communications device, such as a radiotelephone, in which a user interface according to embodiments of the present invention may be utilized.

The present invention will be described more fully hereinafter with reference to the accompanying figures, in which embodiments of the invention are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, steps, operations, elements, and/or components, but do not preclude the presence or addition of one or more other features, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

For purposes of illustration and explanation only, various embodiments of the present invention are described herein in the context of wireless terminals, such as radiotelephones. It will be understood, however, that the present invention is not limited to such embodiments and may be embodied generally in any electronic device. For example, embodiments of the present invention may be utilized as user interfaces for electronic games and/or music players, etc.

Radiotelephones generally refer to communications terminals which provide a wireless communications link to one or more other communications terminals. Radiotelephones may be used in a variety of different applications, including cellular telephone, land-mobile (e.g., police and fire departments), and satellite communications systems. As used herein, the terms mobile terminal, radiotelephone, wireless terminal, and communications device are intended to be interchangeable. A mobile terminal may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

An arrangement of electronic components of an exemplary wireless terminal 10, such as a radiotelephone, is shown schematically in FIG. 1, according to some embodiments of the present invention. The wireless terminal 10 includes an input device 12, a display 14, a transceiver 20, a memory 18, a microphone 11, a speaker 15 and a camera 13 that communicate with a controller 16. The camera 13 may be optional.

The controller 16 can include any standard low-power microprocessor and/or microcontroller used for mobile telephone applications. The controller 16 can include a signal processor and/or a signal processor can be provided as a separate component of the wireless terminal 10.

The transceiver 20 includes a transmitter circuit 22, a receiver circuit 24, and a modem 26, which cooperate to transmit and receive radio frequency signals to remote transceivers via an antenna 28. The radio frequency signals transmitted between the radiotelephone 10 and remote transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. With a cellular communication module, the radiotelephone 10 can communicate via base station(s) using one or more cellular communication protocols such as, for example, AMPS, ANSI-136, GSM, GPRS, EDGE, CDMA, wideband-CDMA, CDMA2000, and UMTS. The cellular base stations may be connected to a Mobile Telephone Switching Office (MTSO) wireless network, which, in turn, can be connected to a public switched telephone network (PSTN) and/or another network.

The memory 18 may be a general purpose memory that is used to store both program instructions for the controller 16 as well as data, such as audio data, video data, configuration data, and/or other data that may be accessed and/or used by the controller 16. The memory 18 may include a nonvolatile read/write memory, a read-only memory and/or a volatile read/write memory. In particular, the memory 18 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored. The memory 18 may include a removable nonvolatile memory card. The foregoing components of the mobile terminal 10 may be included in many conventional mobile terminals and their functionality is generally known to those skilled in the art.

Figure 2:
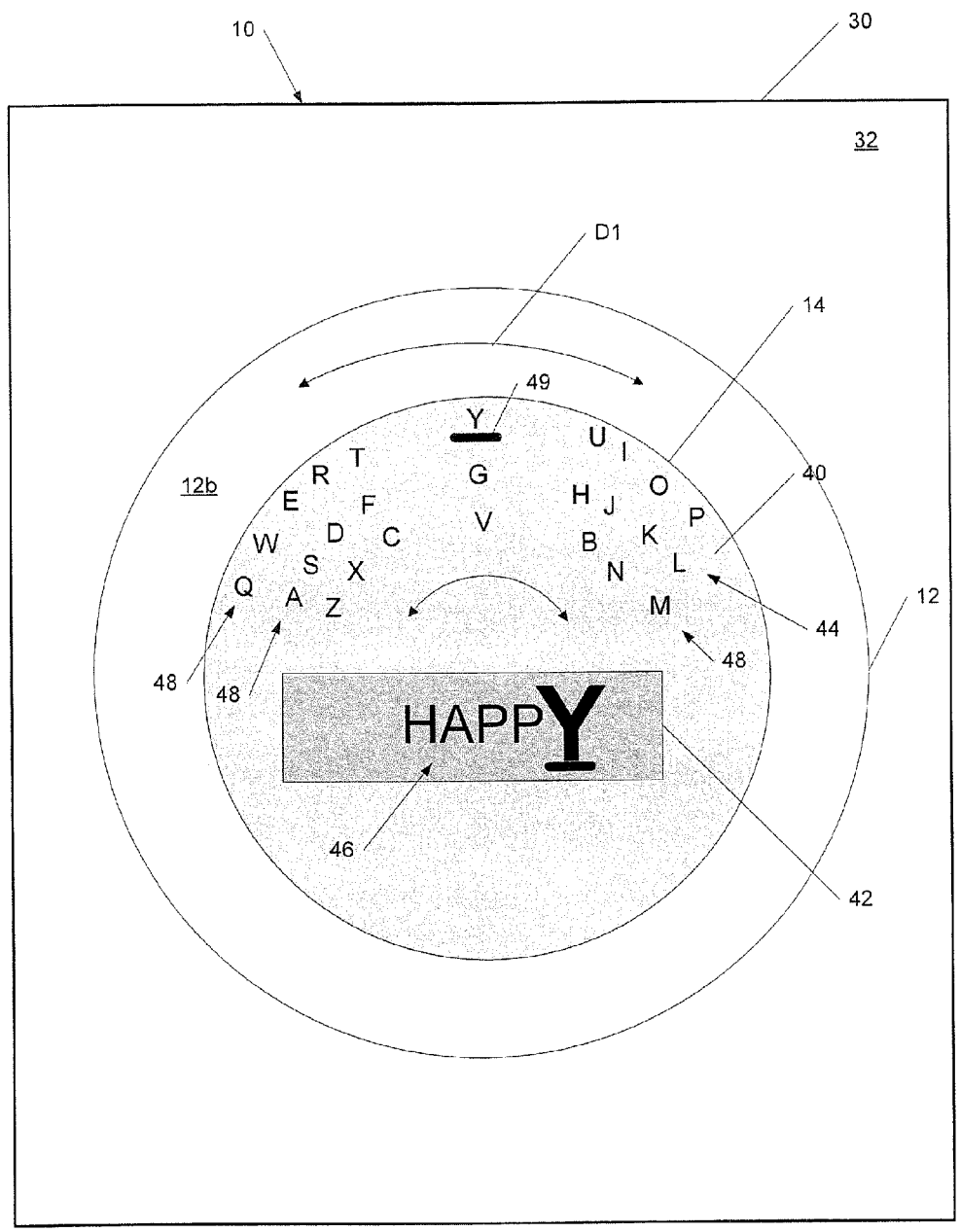
FIGS. 2 and 3 are plan views of an electronic device having a user interface, according to some embodiments of the present invention.
Figure 3:
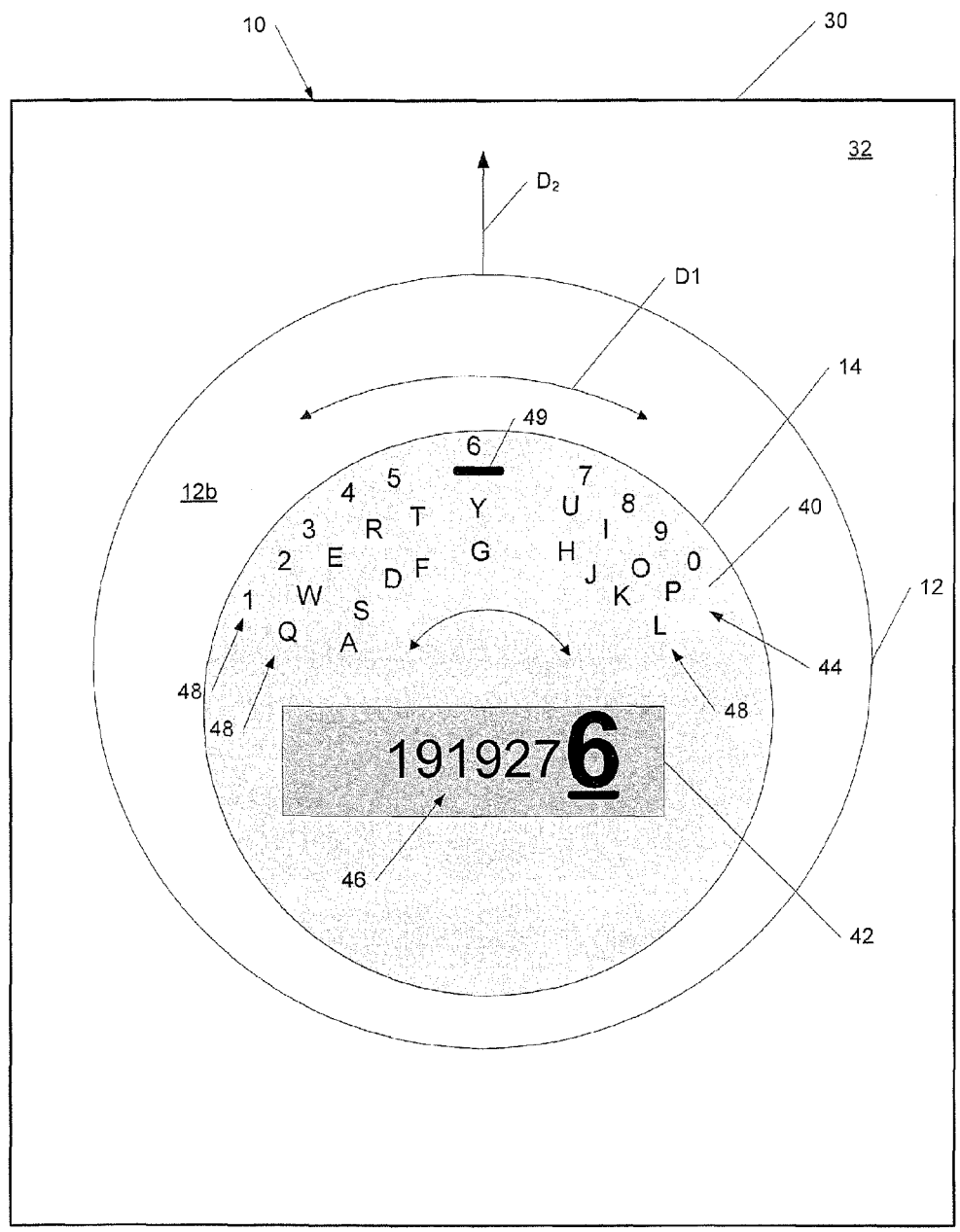

Referring now to FIGS. 2-3, an electronic device, such as wireless terminal 10 of FIG. 1, is illustrated with a user interface that includes an input device 12 and display 14, according to some embodiments of the present invention. The electronic device 10 includes a housing 30 that is configured to enclose a controller, a transceiver, and/or various other electronic components, as would be understood by those skilled in the art of the present invention. Embodiments of the present invention are not limited to wireless terminals. Electronic device 10 may represent any type of electronic device including, but not limited to, music players, electronic games, etc. As such, housing 30 may enclose other electronic components in addition to those conventionally included within wireless terminals.

A display 14 is viewable through a face 32 of the housing 30 and is configured to display an alphanumeric character list therein. The illustrated display 14 has a substantially circular configuration, although other configurations are possible. For example, the display 14 may have a rectangular or other polygonal configuration. The illustrated display 14 includes a first portion 40 and a second portion 42 located within the first portion 40. An alphanumeric character list 44 is displayed within the first portion 40. User selected alphanumeric characters 46 from the displayed character list 44 are displayed in the second portion 42.

In the illustrated embodiment, the alphanumeric character list 44 is displayed within the display first portion 40 in an arcuate configuration and includes a plurality of substantially concentric rows 48 of alphanumeric characters. The illustrated arcuate configuration of displayed character list 44 allows the character list 44 to be displayed within the circular configuration of the display 14. Character list 44, however, could be displayed within the display 14 in various configurations, including a conventional configuration of straight rows of alphanumeric characters. The term "character list", as used herein, is intended to include any configuration of characters and/or alphanumeric characters. For example, a character list may be arranged in the configuration of a conventional keypad, a conventional keyboard, etc. A character list may also be any subset of a conventional keypad, conventional keyboard, etc.

A movable input device 12 circumferentially surrounds the display 14, as illustrated. The illustrated input device 12 is in the shape of a ring with a central opening 12a (FIG. 4A) and is movable by a user (e.g., via a finger) to highlight and select alphanumeric characters in the displayed character list 44. Although having the shape of a ring in the illustrated embodiment, the input device 12 may have other shapes and configurations. For example, the input device 12 and may include two or more portions (e.g., two semi-circular portions) that can perform the rotational and slidable movements described here for highlighting alphanumeric characters of a character list displayed within display 14. Embodiments of the present invention are not limited to the ring configuration.

In some embodiments, the input device 12 can be thought of as being a very low profile joystick with a hollow center to allow for the display 14 to be mechanically/electrically connected to a PCB (printed circuit board) from within the inner diameter of the input device 12. The interior diameter of the input device 12 should be large enough—and the display support narrow enough—so that there is no mechanical interference between input device 12 and display support during North/East/South/West movements. The face of the display 14 should be large enough to conceal the inner mechanics of the input device 12 regardless of position of the input device 12.

In some embodiments, the mechanical structure may be very similar to that of a joystick as far as providing for "North/East/South/West" movement. The input device 12 can rest on a spring-loaded switch to provide the downward/keypress movement. Combined, those two movements may be mechanically similar to the joystick function offered in PLAYSTATION® 2 and 3 game controllers. The scrolling function can be added, in some embodiments, by installing a rotating "ring+position" detection on the outer diameter of the input device 12 shaft (which could allow either partial or 360 degree rotation depending on implementation), or by mounting the entire "N/E/S/W+button press" assembly on a rotating base, etc. Embodiments of the present invention, however, may have many mechanical/electrical implementations and are not limited to those described herein.

Figure 4A:
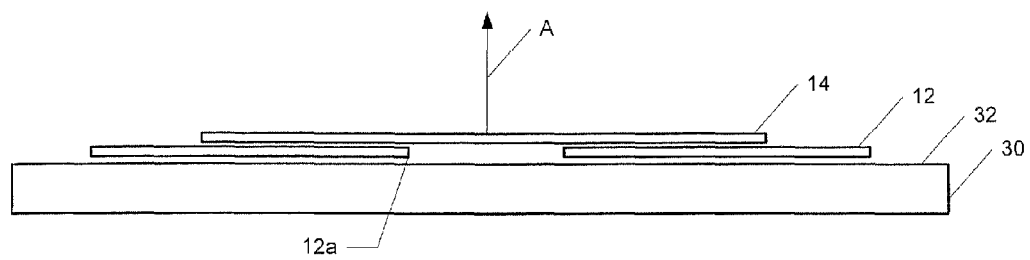
FIG. 4A is a cross sectional view of an electronic device, according to some embodiments of the present invention, wherein a display and input device are oriented relative to each other such that the input device rotates and slides underneath the display.

The illustrated input device 12 is rotatable about an axis A (FIG. 4A) that is substantially normal to the display 14 and is slidable within a plane that is substantially orthogonal to axis A. In some embodiments, the display 14 and input device 12 may be oriented relative to each other such that the input device 12 rotates and slides underneath the display 14, as illustrated in FIG. 4A. Mechanical support for the display 14 (not illustrated) and electrical connections for the display 14 (not illustrated) may extend through the central opening 12a of the input device 12, as would be understood by those skilled in the art.

Figure 4B:
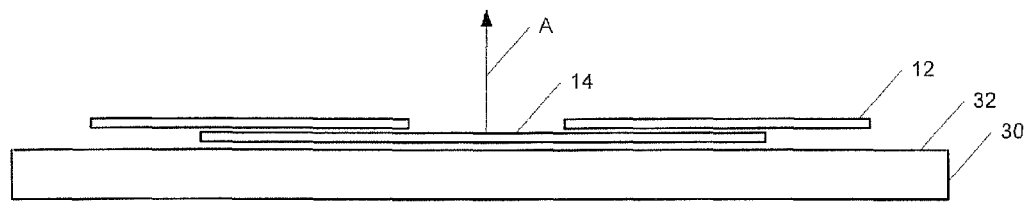
FIG. 4B is a cross sectional view of an electronic device, according to some embodiments of the present invention, wherein a display and input device are oriented relative to each other such that the input device rotates and slides above the display.

In other embodiments, the display 14 and input device 12 are oriented relative to each other such that the input device 12 rotates and slides above the display 14, as illustrated in FIG. 4B. In both of the illustrated embodiments of FIGS. 4A and 4B, the input device 12 is rotatable and slidable within a plane that is substantially parallel with a plane defined by the housing face 32. However, other configurations are possible. For example, the input device 12 may be rotatable and slidable within a plane that is transverse to a plane defined by the housing face 32.

In the illustrated embodiments described herein, display 14 remains stationary and input device 12 moves relative to the stationary display 14. However, embodiments of the present invention are not limited to such a configuration. In some embodiments it may be possible for the display 14 to move relative to the input device 12 and/or for both the display 14 and input device 12 to move.

Rotational and slidable movement of the input device 12 allows a user to highlight alphanumeric characters on the displayed character list 44. The term "highlight", as used herein, is intended to include all ways of visibly identifying an alphanumeric character. In the illustrated embodiments, a cursor 49 is utilized to highlight alphanumeric characters. However, other ways of providing a visual indication of alphanumeric characters may be utilized including, but not limited to, font change, color change, background change, bold display, italicized display, etc.

Referring back to FIGS. 2 and 3, the input device 12 can be rotated in clockwise and counterclockwise directions as indicated by arrow $D_1$. Rotational movement of the input device 12 causes the cursor 49 to move along a row 48 of alphanumeric characters in the displayed character list 44. For example, referring to FIG. 2, counterclockwise rotation of the input device 12 would cause the cursor 49 to move from its current position highlighting the character "Y" to the left along the arcuate row containing the characters "QWERT." Similarly, clockwise rotation of the input device 12 would cause the cursor 49 to move from its current position highlighting the character "Y" to the right along the arcuate row containing the characters "UIOP."

In some embodiments, the input device 12 may be configured to make multiple revolutions in both clockwise and counterclockwise directions. In other embodiments, the input device 12 may have a "home" position and is subjected to a biasing force such that, when a user rotates the input device 12 either in a clockwise or counter-clockwise direction, the input device 12 is urged to return to the "home" position.

In some embodiments, the input device 12 may include one or more detents and/or one or more raised portions on the surface thereof that facilitate rotation and slidable movement of the input device 12 by a user's finger (or other object, such as a stylus). In some embodiments, the surface 12b of the input device 12 may include tactile material that provides friction between a user's finger (or other object, such as a stylus), and facilitates rotation and slidable movement of the input device 12. In some embodiments, the input device 12 may produce a perceptible feel when rotated and/or slid. In some embodiments, the input device 12 may produce an audible sound, such as a click, to a user as the input device 12 is rotated and/or slid.

Sliding movement of the input device 12 causes the cursor 49 to move from one row 48 of characters to another. For example, in FIG. 3, the input device 12 has been slidably moved in the direction $D_2$ such that the cursor 49 has moved to a row 48 located above the upper row displayed within FIG. 2 (i.e., the cursor has moved from the row containing characters "QWERTYUIOP" to the row containing characters "1234567890." Specifically, the cursor 49 has moved from highlighting the character "Y" to the row above and is highlighting the character "6."

Figure 5A:
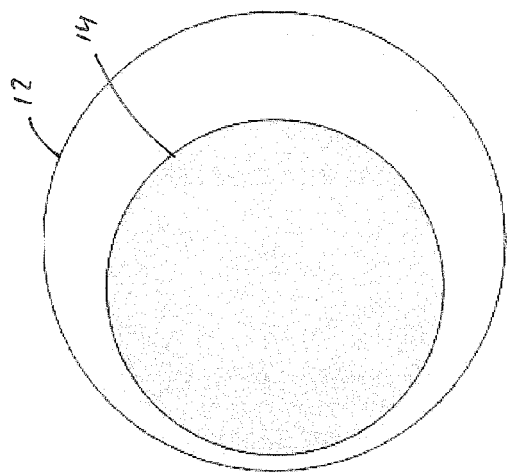
FIGS. 5A-5D illustrate slidable movement of the input device of FIG. 2, according to some embodiments.
Figure 5B:
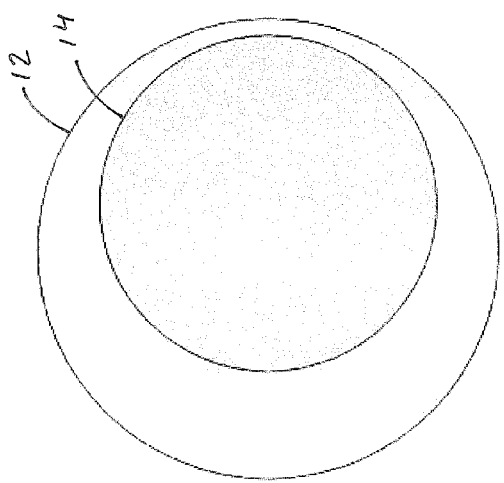
Figure 5C:
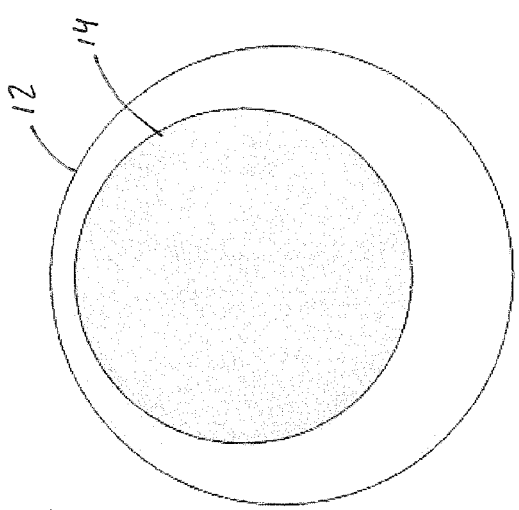
Figure 5D:
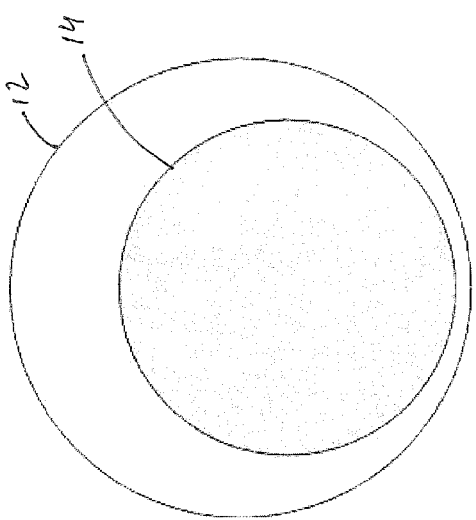

Sliding movement of the input device 12 is further illustrated in FIGS. 5A-5D. In the embodiment illustrated in FIGS. 5A-5D, the input device 12 is movable beneath the display 14 (i.e., the display 14 and input device 12 oriented relative to each other such that the input device 12 rotates and slides underneath the display 14, as illustrated in FIG. 4A). In FIG. 5A, the input device 12 has been slidably moved in a downward or "South" direction, which would cause a cursor (not illustrated) to move down to the row of alphanumeric characters below the row where the cursor was previously located. In FIG. 5B, the input device 12 has been slidably moved in an upward or "North" direction, which would cause a cursor (not illustrated) to move up to the next row of alphanumeric characters in a displayed character list. In FIG. 5C, the input device 12 has been slidably moved in a rightward or "East" direction, which would cause a cursor (not illustrated) to move to the next row to the right of the row of alphanumeric characters where the cursor was located. In FIG. 5D, the input device 12 has been slidably moved in a leftward or "West" direction, which would cause a cursor (not illustrated) to move to the next row to the left of the row of alphanumeric characters where the cursor was located.

Rotational movement of the input device 12 is limited to highlighting an alphanumeric character on a particular row 48. As such, rotational movement of the input device 12 may be considered as a "fine" adjustment of the location of the cursor. Slidable movement of the input device 12 allows the cursor 49 to be moved quickly to new rows 48 of alphanumeric characters and, thus, may be considered as a "coarse" adjustment of the location of the cursor 49.

Referring back to FIGS. 2 and 3, an alphanumeric character highlighted by a cursor in the displayed character list 44 is also displayed in the display second portion 42. For example, in FIG. 2, the "Y" character is highlighted by the cursor 49 and is displayed within the display second portion 42. In FIG. 3, the "6" character is highlighted by the cursor 49 and is displayed within the display second portion 42. In the illustrated embodiment, a currently highlighted alphanumeric character is displayed within the second portion 42 of the display 14 in a different format from selected alphanumeric characters displayed within the display second portion 42. For example, in FIG. 2 the currently highlighted "Y" has a larger font size than the other previously selected alphanumeric characters displayed within the display second portion 42. Currently highlighted alphanumeric characters can be distinguished from previously selected characters displayed within the display second portion 42 in various other ways including, but not limited to, color change, background change, bold display, italicized display, etc.

To select a highlighted alphanumeric character displayed within the display second portion, a user depresses a portion of the input device 12. Accordingly, the input device 12 allows a user to easily and quickly navigate through a displayed character list, highlight an alphanumeric character of interest, and select a highlighted alphanumeric character with a finger or stylus.

In operation, a user utilizes the input device 12 as described above to enter a sequence or string of alphanumeric characters in the display second portion. In wireless communications device embodiments, the user-selected sequence of characters may represent a telephone number to be dialed by a transceiver of the wireless device 10 and/or may represent a text message to be sent or another command to be executed by the controller 16 of the wireless device 10. Similarly, in other electronic device embodiments, the user-selected sequence of characters may represent a command to be executed by the controller of the electronic device.

In wireless communications device embodiments, a call initiation or "send" key (not illustrated) can be activated by a user to initiate a call (or to execute another command) using a sequence of characters entered into the display second portion 42 as described above. A display clearing or "clear" key (not illustrated) can be activated by a user to remove some or all of the alphanumeric characters displayed within the display second portion 42. The input device 12 may include the functionality of a "send" key and/or a "clear" key in some embodiments. In other embodiments, a "send" key and a "clear" key may be located on other portions of the housing 30 of a wireless communications device 10. Call "send" and "clear" keys and the functions performed thereby are well understood by those skilled in the art of wireless communications devices and need not be described further herein.

An input device 12 and display 14 described above with respect to the various embodiments may be located in various positions and locations on an electronic device housing and are not limited to the illustrated positions, locations, and configurations.

The foregoing is illustrative of the present invention and is not to be construed as limiting thereof. Although a few exemplary embodiments of this invention have been described, those skilled in the art will readily appreciate that many variations and modifications are possible in the exemplary embodiments without materially departing from the novel teachings and advantages of this invention. Accordingly, all such variations and modifications are intended to be included within the scope of this invention as defined in the claims. Therefore, it is to be understood that the foregoing is illustrative of the present invention and is not to be construed as limited to the specific embodiments disclosed, and that variations and modifications to the disclosed embodiments, as well as other embodiments, are intended to be included within the scope of the appended claims. The invention is defined by the following claims, with equivalents of the claims to be included therein.

That which is claimed is:

1. An electronic device, comprising:
   a housing;
   a display viewable through a face of the housing, wherein the display comprises a first portion and a second portion, wherein an alphanumeric character list is displayed within the first portion, wherein each alphanumeric character in the alphanumeric character list can be highlighted for selection, and wherein user selected alphanumeric characters from the alphanumeric character list in the first portion are displayed in the second portion; and
   an input device that circumferentially surrounds the display and that is movable relative to the display by a user to highlight a respective alphanumeric character in the displayed alphanumeric character list, wherein the input device is rotatable about an axis that is substantially normal to the display and slidable within a plane that is substantially orthogonal to the axis, and wherein the input device is depressible by the user to select a highlighted alphanumeric character.

2. The electronic device of claim 1, wherein the input device is rotatable and slidable within a plane that is substantially parallel with a plane defined by the housing face.

3. The electronic device of claim 1, wherein the display and input device are oriented relative to each other such that the input device rotates and slides underneath the display.

4. The electronic device of claim 1, wherein the display and input device are oriented relative to each other such that the input device rotates and slides above the display.

5. The electronic device of claim 1, wherein a currently highlighted alphanumeric character is displayed within the second portion of the display in a different format from selected alphanumeric characters displayed within the display second portion.

6. The electronic device of claim 1, wherein the alphanumeric character list is displayed within the first portion in an arcuate configuration.

7. The electronic device of claim 6, wherein the alphanumeric character list is displayed within the first portion as a plurality of concentric rows of alphanumeric characters.

8. The electronic device of claim 7, wherein characters in the displayed alphanumeric character list are highlighted by a cursor, and wherein rotational movement of the input device causes the cursor to move along a row of alphanumeric characters.

9. The electronic device of claim 8, wherein clockwise rotational movement of the input device causes the cursor to move along a row of alphanumeric characters in a clockwise direction, and wherein counterclockwise rotational movement of the input device causes the cursor to move along a row of alphanumeric characters in a counterclockwise direction.

10. The electronic device of claim 7, wherein characters in the displayed alphanumeric character list are highlighted by a cursor, and wherein slidable movement of the input device causes the cursor to move from one row to another.

11. The electronic device of claim 1, wherein the electronic device is a wireless communications device.

12. A user interface for an electronic device, comprising:
    a display viewable through a face of a housing of the electronic device, wherein the display comprises a first portion and a second portion, wherein an alphanumeric character list is displayed within the first portion, wherein each alphanumeric character in the alphanumeric character list can be highlighted for selection, and wherein user selected alphanumeric characters from the alphanumeric character list in the first portion are displayed in the second portion; and
    an input device circumferentially surrounding the display, wherein the input device is rotatable and slidable relative to the display by a user to highlight a respective alphanumeric character in the displayed alphanumeric character list, and is depressible by the user to select a highlighted alphanumeric, and wherein user selected alphanumeric characters are displayed in the display second portion.

13. The user interface of claim 12, wherein characters in the displayed alphanumeric character list are highlighted by a cursor, wherein rotational movement of the input device causes the cursor to move along a row of alphanumeric characters in the displayed character list, and wherein slidable movement of the input device causes the cursor to move from one row to another.

* * * * *